(12) United States Patent
Yanagihara et al.

(10) Patent No.: US 10,516,752 B2
(45) Date of Patent: Dec. 24, 2019

(54) EDGE CACHING SHARED DEVICES

(71) Applicant: Apple Inc., Cupertino, CA (US)

(72) Inventors: Kazuhisa Yanagihara, Cupertino, CA (US); Jason R. Thorpe, Cupertino, CA (US); Michael Abbott, Woodbury, MN (US)

(73) Assignee: Apple Inc., Cupertino, CA (US)

( * ) Notice: Subject to any disclaimer, the term of this patent is extended or adjusted under 35 U.S.C. 154(b) by 662 days.

(21) Appl. No.: 14/732,412

(22) Filed: Jun. 5, 2015

(65) Prior Publication Data

US 2016/0359998 A1 Dec. 8, 2016

(51) Int. Cl.
*G06F 15/16* (2006.01)
*H04L 29/08* (2006.01)
*H04L 29/14* (2006.01)

(52) U.S. Cl.
CPC ...... *H04L 67/2842* (2013.01); *H04L 67/1034* (2013.01); *H04L 69/40* (2013.01)

(58) Field of Classification Search
CPC . H04L 67/2842; H04L 67/1034; H04L 69/40; H04L 67/1004; H04L 67/1031; H04L 67/1021
See application file for complete search history.

(56) References Cited

U.S. PATENT DOCUMENTS

| | | | |
|---|---|---|---|
| 8,108,428 B1* | 1/2012 | Wencel | G06Q 10/10 707/790 |
| 8,560,692 B1 | 10/2013 | Chandra Sekhar et al. | |
| 8,635,339 B2 | 1/2014 | Luna | |
| 9,699,139 B2* | 7/2017 | Mensah | H04L 29/12547 |
| 2009/0106358 A1* | 4/2009 | Mitsuoka | G06F 17/30604 709/203 |
| 2010/0125626 A1* | 5/2010 | Lucas | H04L 67/1008 709/203 |
| 2010/0217793 A1* | 8/2010 | Preiss | H04L 67/1008 709/203 |
| 2010/0299553 A1* | 11/2010 | Cen | H04L 29/08729 714/4.1 |
| 2013/0318191 A1* | 11/2013 | Yin | H04L 67/2842 709/213 |
| 2013/0326133 A1 | 12/2013 | Lee et al. | |
| 2014/0019576 A1 | 1/2014 | Lobo et al. | |
| 2014/0040412 A1 | 2/2014 | Yanagihara et al. | |

\* cited by examiner

*Primary Examiner* — Ryan J Jakovac
(74) *Attorney, Agent, or Firm* — Fish & Richardson P.C.

(57) ABSTRACT

Disclosed are systems, methods, devices and non-transitory, computer-readable storage mediums for edge caching shared devices. In some implementations, a method comprises: receiving, by a client device on a local area network (LAN), a request for data transfer from a user of the client device; determining, by the client device, if one of a plurality of edge cache servers on the LAN has established server affinity with the user; if an edge cache server has established server affinity with the user, initiating, by the client device, data transfer between the client device and the edge cache server; and if no edge cache server on the LAN has established server affinity with the user, establishing, by the client device, server affinity between the user and one of the plurality of edge cache servers.

12 Claims, 6 Drawing Sheets

EDGE CACHING SHARED DEVICES

TECHNICAL FIELD

The disclosure relates generally to client/server computer systems, and more particularly to edge cache servers.

BACKGROUND

The speed at which content may be downloaded from a network server to a client device is limited by network server bandwidth. Additionally, the network server may be out of service, preventing the client device from downloading the content. An edge cache server (or "cache engine") is a dedicated network server (or service acting as a server) that saves Web pages or other digital content locally. By placing previously requested information in temporary storage (or cache), an edge cache server speeds up access to the digital content and reduces demand on Internet bandwidth consumption.

SUMMARY

Disclosed are systems, methods, devices and non-transitory, computer-readable storage mediums directed to edge caching shared devices.

In some implementations, a method comprises: receiving, by a client device on a local area network (LAN), a request for data transfer from a user of the client device; determining, by the client device, if one of a plurality of edge cache servers on the LAN has established server affinity with the user; if an edge cache server has established server affinity with the user, initiating, by the client device, data transfer between the client device and the edge cache server; and if no edge cache server on the LAN has established server affinity with the user, establishing, by the client device, server affinity between the user and one of the plurality of edge cache servers.

In some implementations, a method comprises: receiving, by an edge cache server on a local area network (LAN), a locate server request from a client device; determining, by the edge cache server, that the edge cache server has established server affinity with a user of the client device; sending affinity data to the client device; receiving, by the edge cache server, a request to transfer data from the client device; determining, by the edge cache server, that a new version of the requested data is available; downloading, by the edge cache server, the new version of user data; and sending, by the edge cache server, the new version of user data to the client device.

Other implementations are directed to systems, devices and non-transitory, computer-readable mediums. Particular implementations provide at least the following advantages. A client device operating on a local area network (LAN) is personalized to a user by establishing server affinity between the user and an edge cache server on the LAN. Future transactions by the user on the LAN are directed to the edge cache server rather than cloud storage, thus more rapidly personalizing the device to the user.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DESCRIPTION

Example System

Figure 1:
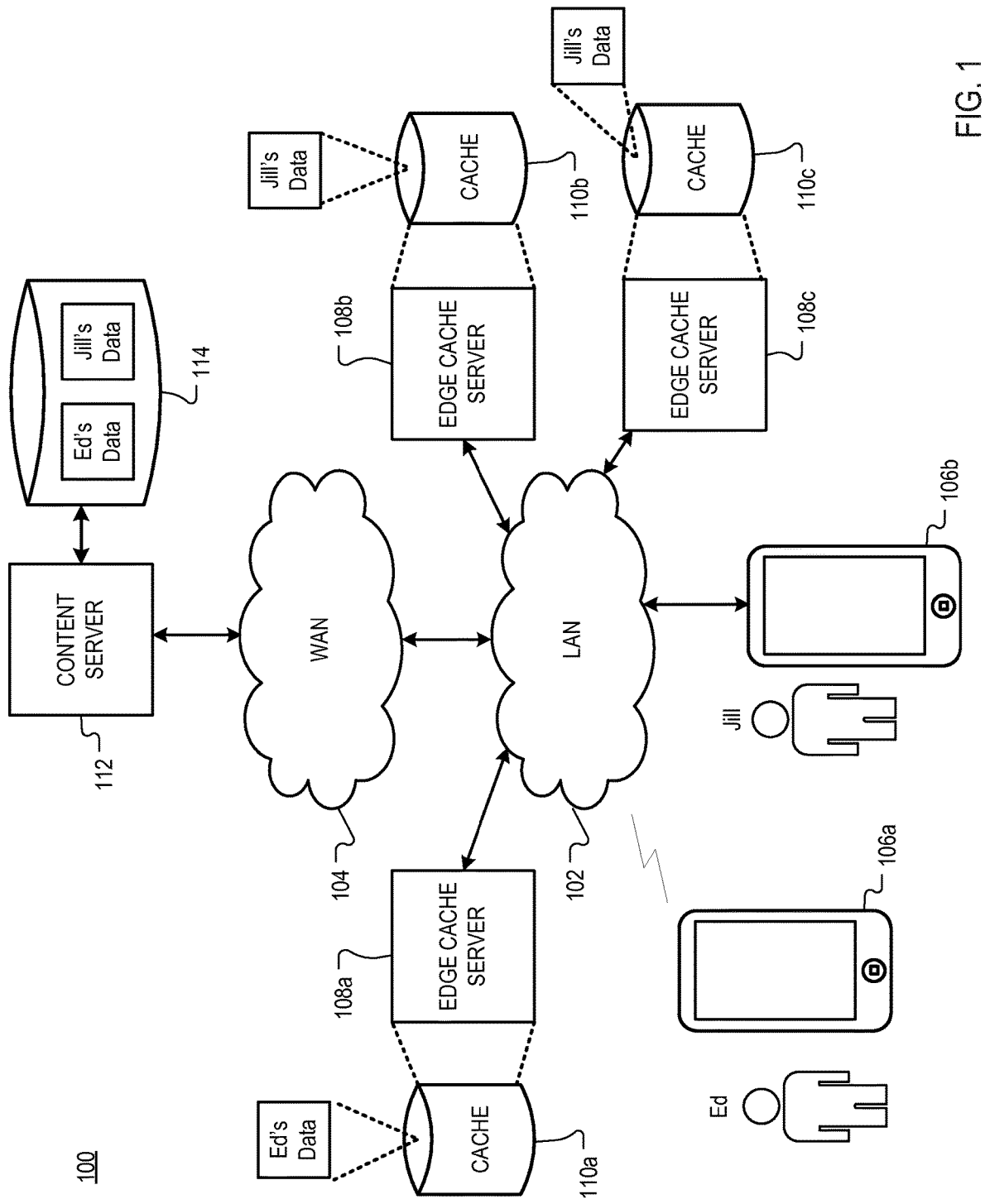
FIG. 1 is a conceptual block diagram of an example system for edge caching shared devices.

FIG. 1 is a conceptual block diagram of an example system for edge caching shared devices. In some implementations, system 100 can include LAN 102 coupled to wide area network (WAN) 104 (e.g., the Internet) and client devices 106a, 106b (collectively, client devices 106). WAN 104 is coupled to content server 112, which is coupled to cloud storage 114. Cloud storage 114 can store digital content, including but not limited to: Web pages, documents, photo libraries, photo streams, backup data, video files, audio files and backup data. Client devices 106 can include but are not limited to, notebook computers, desktop computers, tablet devices, smartphones and wearable devices (e.g., a smart watch). In the example shown, LAN 102 is located in a classroom environment. LAN 102, however, can be located in any environment where client devices are shared by multiple users.

Edge cache servers 108a-108c (collectively, edge cache servers 108) are coupled to LAN 102. Edge cache servers 108a-108c include respective caches 110a-110c storing user data uploaded from client devices 106a, 106b. Although system 100 includes three edge cache servers (108a-108c) and two client devices (106a, 106b), in practice there can be any number of edge cache servers and client devices. Client devices 106 and edge cache servers 108 are coupled to LAN 102, either wirelessly or through a wired connection, using, for example, a wireless router (e.g., IEEE802.11x router) or network switch (e.g., Ethernet switch). The operation of system 100 will now be described in further detail below using an example use case where two students Ed and Jill are using client devices in a classroom environment.

On Monday, Ed is assigned to client device 106a, which in this example is a wireless tablet computer. Ed is a new student and he has never used client device 106a. At the beginning of class, Ed logs onto client device 106a with his logon credentials (e.g., a user ID and password) that he previously selected when he registered for the class online. After entering his logon credentials, Ed's user ID is hashed on client device 106a using a hash function (e.g., MD5 message digest). In some implementations, if the user data is owned by someone other than Ed (e.g., the teacher), an owner ID can be hashed instead of or in addition to hashing the user ID. Client device 106a makes a locate server call on LAN 102 to locate an edge cache server that has server affinity with Ed. The locate server call includes the hash, which will be used by each edge cache server to determine if Ed has server affinity with the edge cache server. Server affinity means all future data transactions by Ed will be directed to the server for which Ed has established server affinity. Since Ed is a new student and has not stored data on system 100, none of edge cache servers 108 have server affinity with Ed and therefore none of edge cache servers 108 provide a positive response to the call. Client device 106a then randomly selects edge cache server 108a to store Ed's data and sends a request to edge cache server 108a to create a server affinity with Ed. In response to the request, edge cache server 108a associates the hash with an affinity timestamp in an affinity table, as described in reference to FIG. 2. Ed now has a server affinity with edge cache server 108a.

Ed completes a class assignment on client device 106a and saves his data to his online account so that he can access the data later. When Ed saves his data, client device 106a makes another locate server call on LAN 102. Edge cache server 108a receives the call and checks to see if Ed's hash maps to an affinity timestamp in an affinity table maintained by the edge cache server. Since the hash maps to an affinity timestamp in its affinity table, edge cache server 108a responds to the call by sending the affinity timestamp to client device 106a. The affinity timestamp indicates a last time and date in which Ed's user data was accessed on edge cache server 108a. Client device 106a then uploads Ed's user data to edge cache server 108a. Edge cache server 108a then uploads Ed's user data to content server 112, which stores Ed's data in cloud storage 114. If the upload succeeds, edge cache server 108a caches Ed's user data in cache 110a (a write-through cache).

In some implementations, client device 106a syncs to edge cache server 108a, and edge cache server 108a uses incremental upload processing to "trickle" the data up to content server 112 where the data is stored in cloud storage 114. For example, the data can be stored in a database associated with Ed's online account. Content server 112 confirms that data was received, and sends a message to client device 106a to indicate that the data has been stored. Ed later works from home and syncs directly with content server 112 and changes his data stored on cloud storage 114.

On Tuesday, Ed returns to class and attempts to retrieve his data from cloud storage 114. Ed is assigned client device 106b. Ed logs on to client device 106b and attempts to retrieve his user data. Client device 106b makes a locate server call on LAN 102. Edge cache server 108a receives the call and checks to see if Ed's hash maps to an affinity timestamp. Since the hash maps to an affinity timestamp, edge cache server 108a responds to the call by sending the affinity timestamp to client device 106b. Before serving the cached user data, edge cache server 108a checks with content server 112 to see if there is a new version of Ed's user data available. Content server 112 responds indicating that a new version is available. Edge cache server 108a downloads the new version of Ed's data from content server 112 and serves the new version to client device 106b.

Referring again to Monday, Jill is assigned to client device 106b and Ed is assigned to client device 106a. Jill already has a server affinity with edge cache server 108b from a previous session and has her user data stored in cache 110b. Jill logs on to client device 106b which attempts to retrieve her user data by making a locate server call with her hash. Unfortunately, edge cache server 108b, which has server affinity with Jill, is down and cannot respond to the locate server call. In some implementations, client device 106b caches previous affinity results so it does not have to perform a locate server request and query edge cache servers for affinity timestamps for each content upload/download.

When no response or a negative response to the call is received, client device 106b randomly assigns edge cache server 108c to cache Jill's data in cache 110c. Because Jill's data is not cached by edge cache server 108c, edge cache server 108c downloads Jill's data from content server 112 and serves the data to client device 106b.

Extending this example, let's assume that edge cache server 108a stored Jill's data when edge cache server 108b failed. In this example use case, edge cache server 108a would respond to a locate server call from client device 106b with an affinity timestamp that indicates the time and date at which Jill's user data was lasted accessed and then serve Jill's user data to client device 106b. In other implementations, the affinity timestamp and the size of Jill's data is used to select edge cache server 108a to replace edge cache server 108b.

Figure 2:
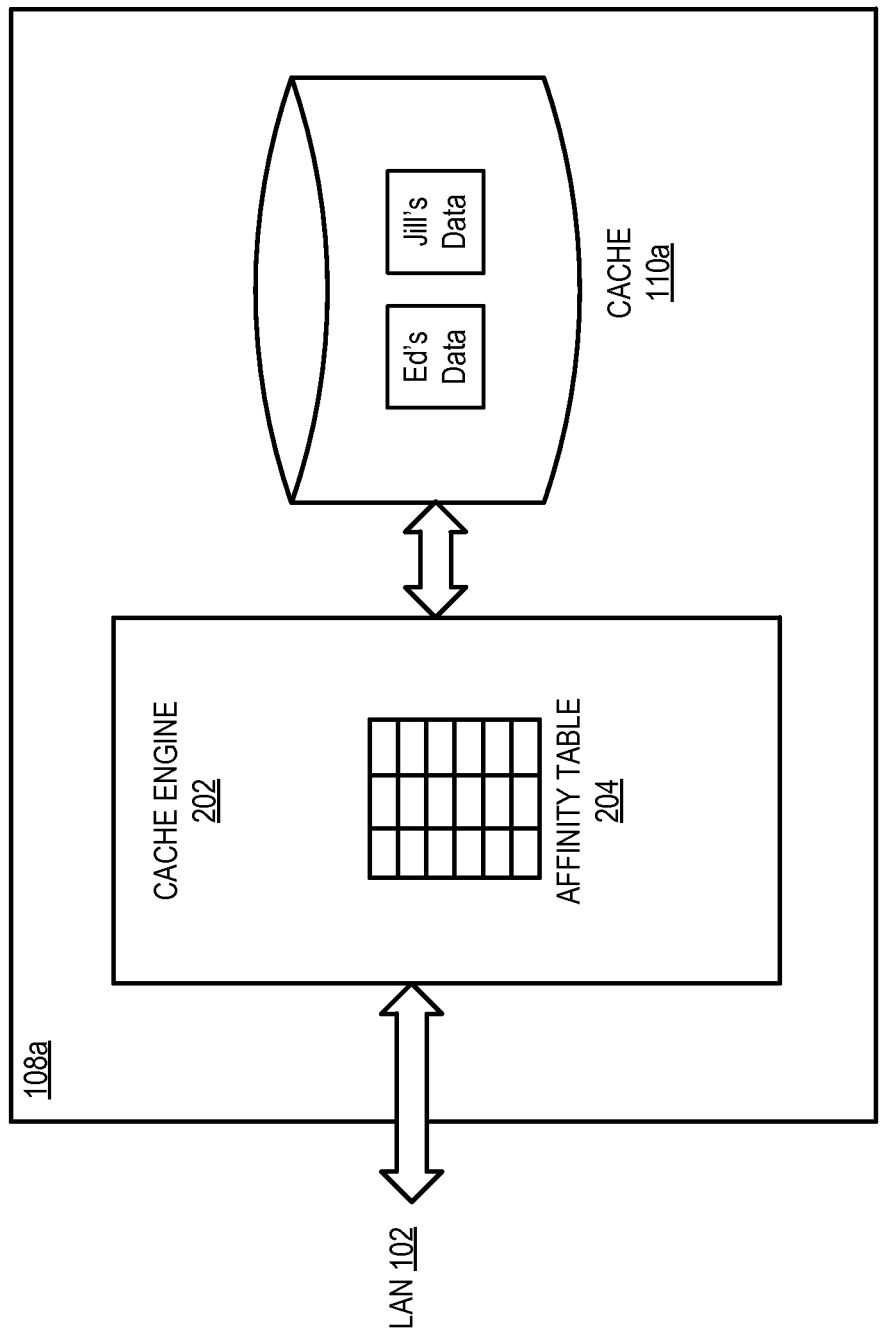
FIG. 2 is a conceptual block diagram of an example configuration of an edge cache server.

FIG. 2 is a conceptual block diagram of an example configuration of edge cache server 108a. Edge cache servers 108b, 108c can be configured in a similar manner. In some implementations, edge cache server 108a includes cache engine 202, affinity table 204 and cache 110a. Cache engine 202 includes code for communicating with client devices 106 and edge cache servers 108 over LAN 102 (e.g., a TCP/IP stack). Cache engine 202 also includes code that facilitates the retrieval and serving of cached user data to client devices 106. Cache engine 202 includes code that assists other edge cache servers 108 in replicating its cached data, as described in reference to FIG. 4. In some implementations, cache engine 202 includes code for registering a cache service with LAN 102, advertising the cache service on LAN 102 and implementing other cache engine functionality.

In some implementations, affinity table 204 is a map that maps a user hash to an affinity data. The affinity data can include a timestamp that indicates a time and date when the cached user data was last accessed. Affinity data can also include a binary or Boolean value that indicates "yes/no" or "true/false" regarding the server affinity, a machine type, data size or available storage space. Referring to the previous use case, the hash received in a locate server call made by client device 106a is mapped using affinity table 204 to determine if Ed has server affinity with edge cache server 108a (e.g., there is an affinity timestamp that maps to Ed's hash). If an affinity timestamp exists, it is sent to client device 106a. If not a negative or no response is sent to client device 106a. In some implementations, affinity table 204 can be stored in another LAN device, such as a router or network switch.

Example Processes

Figure 3:
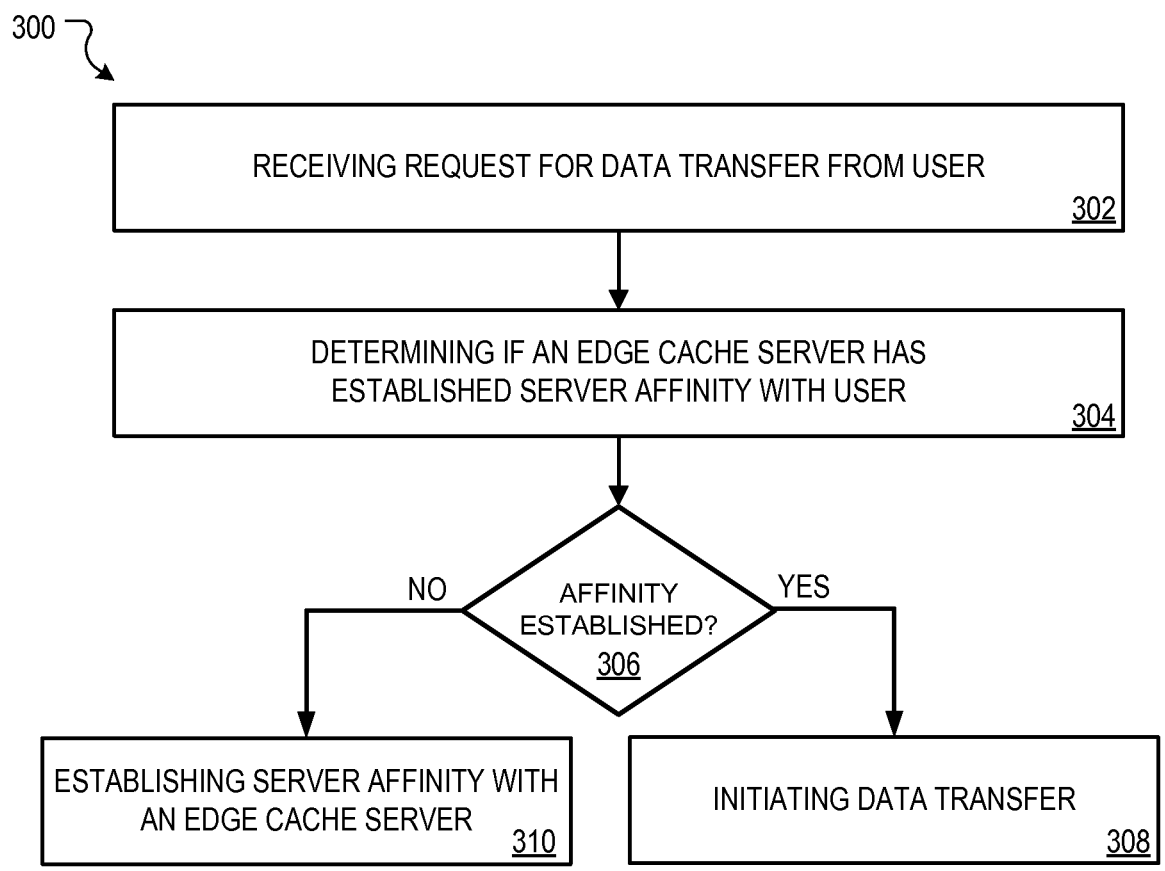
FIG. 3 is a flow diagram of an example edge caching process performed by a client device.

FIG. 3 is a flow diagram of an example process 300 performed by a client device. Process 300 can be implemented by, for example, device architecture 500 as described in reference to FIG. 5.

In some implementations, process 300 can begin by receiving a request for data transfer from a user of a client device (302). Process 300 can continue by determining if one of a plurality of edge cache servers on the LAN has established server affinity with the user (304). For example, server affinity can be established by determining that a hash of a user ID (and/or owner ID) maps to affinity data (e.g., an affinity timestamp) associated with the user using an affinity table maintained by an edge cache server. If there is a mapping to affinity data, then there is server affinity between the user and the edge cache server and the affinity data is sent to the client device. If (306) server affinity was established, process 300 initiates data transfer with the edge cache server (308). If (306) server affinity was not established, process 300 establishes server affinity between the user and one of the plurality of edge cache servers (310). For example, an edge cache server can be randomly selected or selected based on an affinity timestamp and/or a size of the user data cached.

Figure 4:
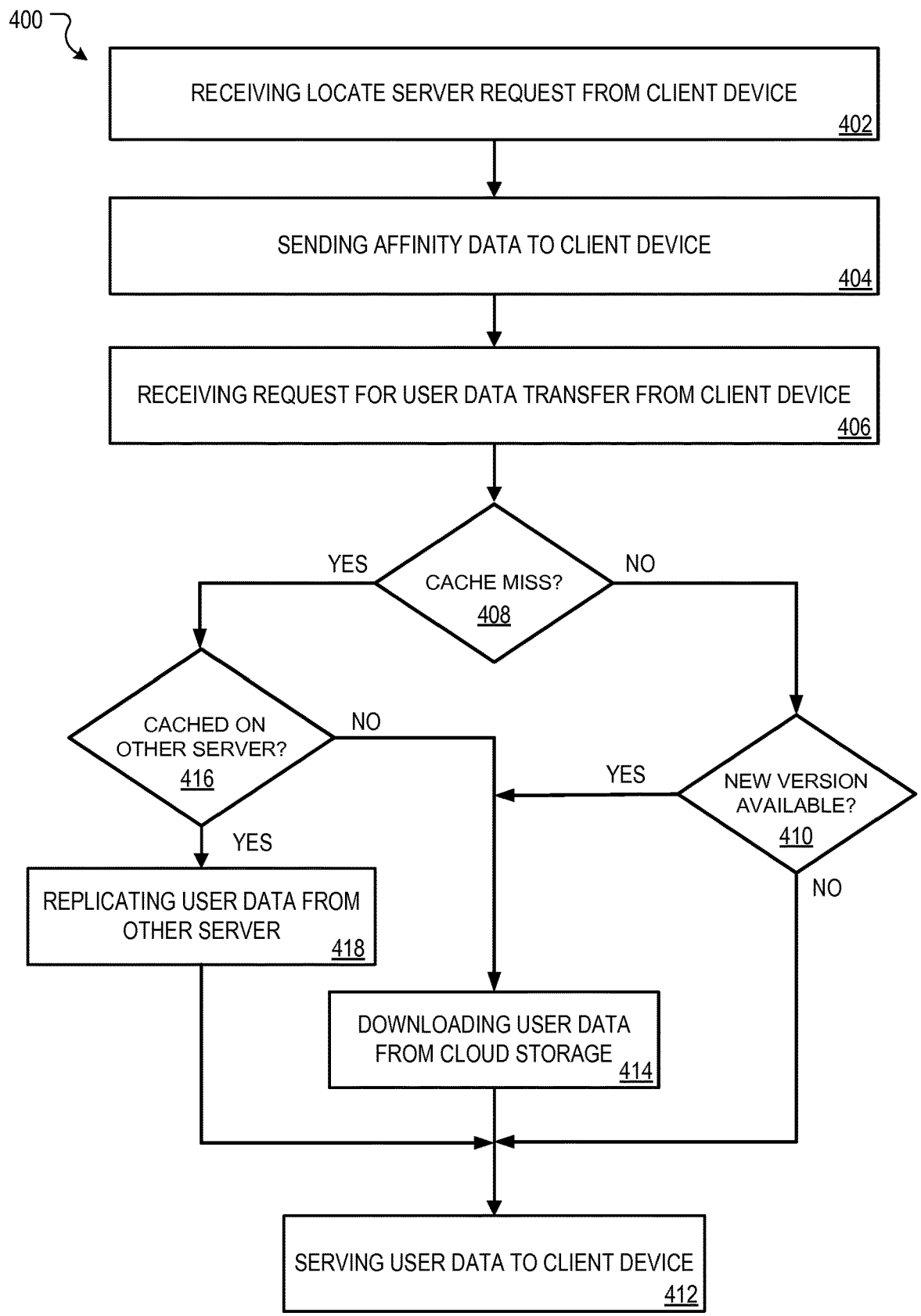
FIG. 4 is a flow diagram of an example edge caching process performed by an edge cache server.

FIG. 4 is a flow diagram of an example process 400 performed by an edge cache server. Process 400 can be implemented by, for example, device architecture 600 as described in reference to FIG. 6. In some implementations, process 400 can begin by receiving a request for user data transfer from a client device on a LAN (402) and, in response, sending affinity data (e.g., an affinity timestamp) to the client device (404).

Process 400 continues by receiving a request for user data transfer (406) and determining if (408) there is a cache miss. If (408) there is not a cache miss, process 400 determines if (410) a new version of the user data is available in cloud storage. If (410) there is not a new version available, process 400 serves the cached user data to the client device (412). If (410) a new version is available, process 400 downloads the new version of user data from cloud storage (414) and serves the new version of user data to the client device (412).

If (408) there is a cache miss, process 400 determines if (416) the user data is cached on a second edge cache server. If (416) the data is not cached on a second edge cache server, process 400 downloads the user data from cloud storage (414) and serves the user data to the client device (412). If (416) the data is cached on a second edge cache server on the LAN, process 400 replicates the user data (418) on the edge cache server and serves the user data to the client device (412).

Example Client Device Architecture

Figure 5:
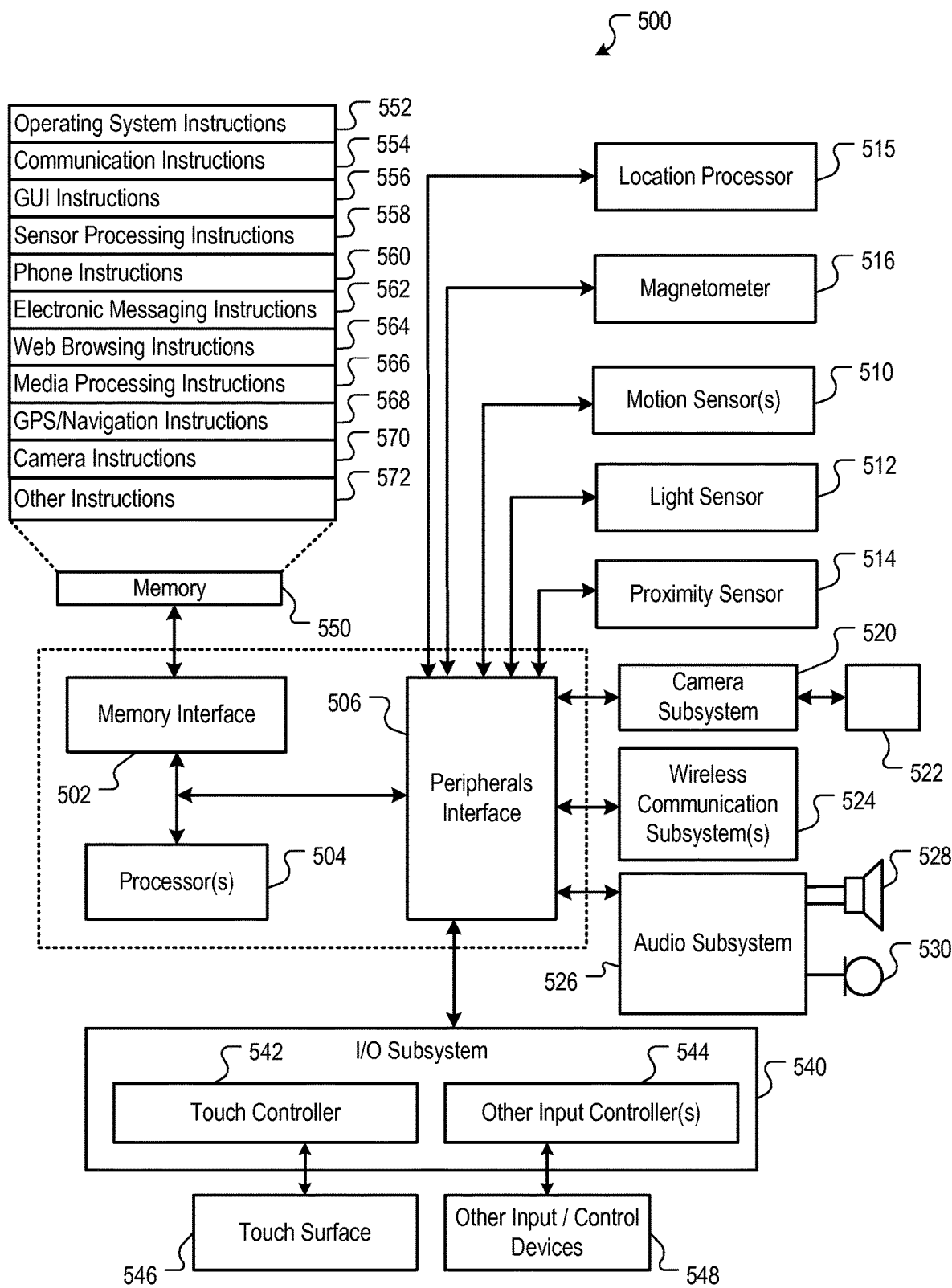
FIG. 5 is a block diagram of an example architecture for a client device implementing the features and processes described in reference to FIGS. 1-4.

FIG. 5 is a block diagram of an example architecture 500 for a client device implementing the features and processes described in reference to FIGS. 1-4. Architecture 500 may be implemented in any location aware mobile device for generating the features described in reference to FIGS. 1-4, including but not limited to portable computers, smart phones, tablet computers, game consoles, wearable computers and the like. Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor 510, light sensor 512, and proximity sensor 514 may be coupled to peripherals interface 506 to facilitate orientation, lighting, and proximity functions of the device. For example, in some implementations, light sensor 512 may be utilized to facilitate adjusting the brightness of touch surface 546. In some implementations, motion sensor 510 (e.g., an accelerometer, gyros) may be utilized to detect movement and orientation of the device. Accordingly, display objects or media may be presented according to a detected orientation (e.g., portrait or landscape).

Other sensors may also be connected to peripherals interface 506, such as a temperature sensor, a biometric sensor, or other sensing device, to facilitate related functionalities.

Location processor 515 (e.g., GNSS receiver chip) may be connected to peripherals interface 506 to provide geo-referencing. Electronic magnetometer 516 (e.g., an integrated circuit chip) may also be connected to peripherals interface 506 to provide data that may be used to determine the direction of magnetic North. Thus, electronic magnetometer 516 may be used as an electronic compass.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication system may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, 802.x communication networks (e.g., Wi-Fi, Wi-Max), code division multiple access (CDMA) networks, NFC and a Bluetooth™ network. Wireless communication subsystems 524 may include hosting protocols such that the device may be configured as a base station for other wireless devices. As another example, the communication subsystems may allow the device to synchronize with a host device using one or more protocols, such as, for example, the TCP/IP protocol, HTTP protocol, UDP protocol, and any other known protocol.

Audio subsystem 526 may be coupled to a speaker 528 and one or more microphones 530 to facilitate voice-enabled functions, such as voice recognition, voice replication, digital recording, and telephony functions.

I/O subsystem 540 may include touch controller 542 and/or other input controller(s) 544. Touch controller 542 may be coupled to a touch surface 546. Touch surface 546 and touch controller 542 may detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface 546. In one implementation, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some implementations, device 500 may present recorded audio and/or video files, such as MP3, AAC, and MPEG video files. In some implementations, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, WINDOWS, or an embedded operating system such as VxWorks. Operating system 552 may include instructions for handling basic system services and for performing hardware dependent tasks. In some implementations, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device. Memory 550 may include: graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GPS/Navigation instructions 568 to facilitate GPS and navigation-related processes; camera instructions 570 to facilitate camera-related processes and functions; and other instructions 572 for performing some or all of the processes, as described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs).

Example Server Computer Architecture

Figure 6:
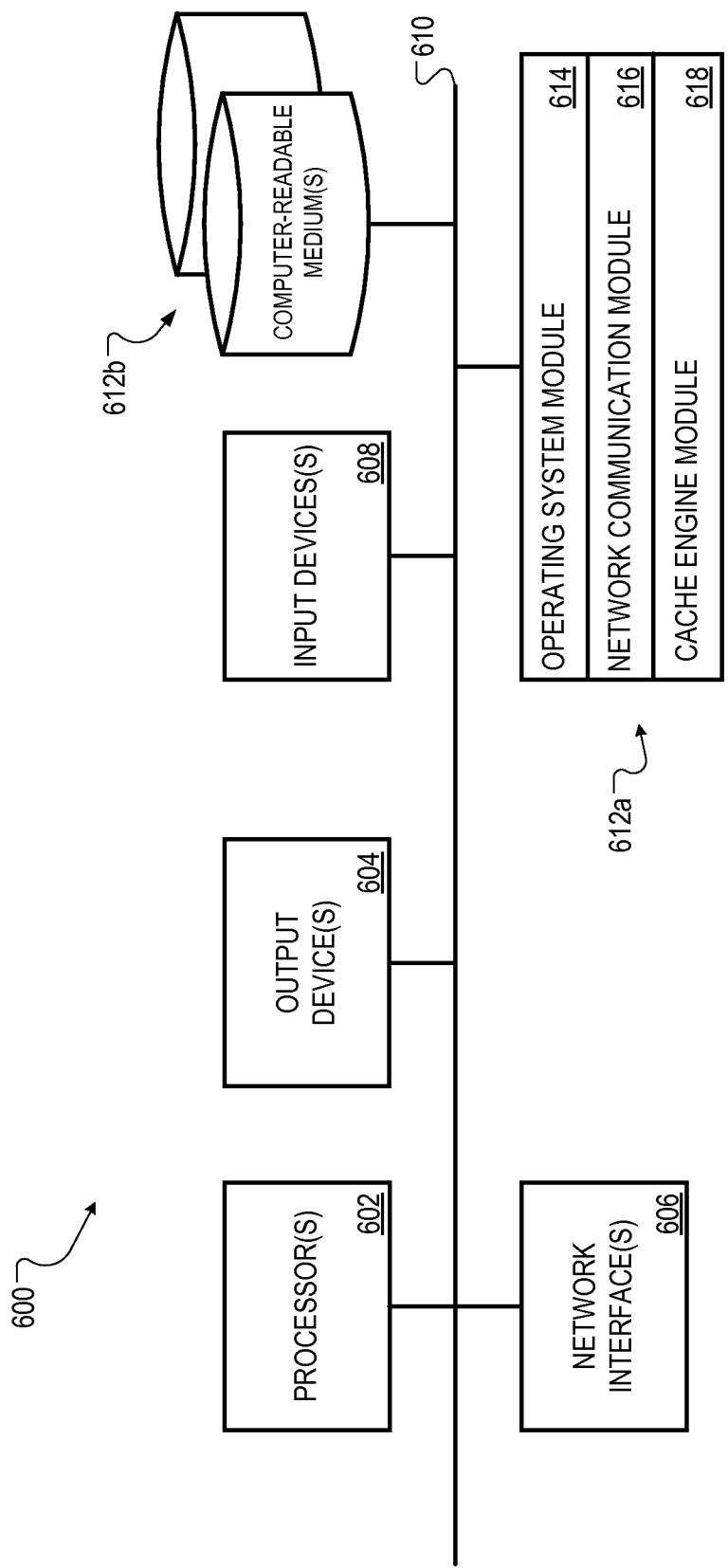
FIG. 6 is a block diagram of an example architecture for an edge cache server implementing the features and processes described in reference to FIGS. 1-4.

FIG. 6 is a block diagram of an example server architecture 600 for implementing the features and processes described in reference to FIGS. 1-4. Other architectures are possible, including architectures with more or fewer components. In some implementations, architecture 600 includes processor(s) 602 (e.g., dual-core Intel® Xeon® Processors), output device(s) 604 (e.g., LCD), network interface(s) 606, input device(s) 608 (e.g., mouse, keyboard, touch-sensitive display), non-transitory computer-readable medium(s) 612b and memory 612a (e.g., RAM, ROM, SDRAM, hard disk, optical disk, flash memory, etc.). These components can exchange communications and data over one or more communication channels 610 (e.g., buses), which can utilize various hardware and software for facilitating the transfer of data and control signals between components.

The term "non-transitory computer-readable medium" refers to any medium that participates in providing instructions to processor 602 for execution, including without limitation, non-volatile media (e.g., optical or magnetic disks) and volatile media (e.g., memory).

Computer-readable mediums 612b or memory 612a can further include operating system 614 (e.g., Mac OS® server, Windows® NT server), network communication module 616 and content management/server module 618. Operating system 614 can be multi-user, multiprocessing, multitasking, multithreading, real time, etc. Operating system 614 performs basic tasks, including but not limited to: recognizing input from input devices 608 and providing output to output devices 604; keeping track and managing files and directories on storage devices 612b and memory 612a; controlling peripheral devices; and managing traffic on the one or more communication channels 610. Network communications module 616 includes various components for establishing and maintaining network connections (e.g., software for implementing communication protocols, such as TCP/IP, HTTP, UDP, HLS etc.). Cache engine 618 performs at least some of the processes described in reference to FIGS. 2 and 4.

Architecture 600 can be included in any computer device, including one or more server computers each having one or more processing cores. Architecture 600 can be implemented in a parallel processing or peer-to-peer infrastructure or on a single device with one or more processors. Software can include multiple software components or can be a single body of code.

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, features may be implemented on a computer having a display device, such as a CRT (cathode ray tube) or LCD (liquid crystal display) monitor for displaying information to the author, and a keyboard and a pointing device, such as a mouse or a trackball by which the author may provide input to the computer.

The features may be implemented in a computer system that includes a back-end component, such as a data server or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include a LAN, a WAN and the computers and networks forming the Internet.

The computer system may include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an Application Programming Interface (API). An API may define on or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are operable even if the embodiments lack all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    receiving, by a client device, an affinity timestamp from a first edge cache server indicating a time and a date that data associated with a user was last accessed;
    comparing the affinity timestamp received from the first edge cache server with an affinity timestamp received from a second edge cache server;
    determining, based on the comparing, that the client device established affinity with the first edge cache server;
    transmitting, by the client device, a request for the first edge cache server for transfer of the data associated with the user;

determining, by the client device based on not receiving a response to the request for the first edge cache server, that the first edge cache server is unavailable, the first edge cache server having previously established server affinity with the user;

selecting, by the client device, in response to the determining that the first edge cache server is unavailable based on not receiving a response to the request for the first edge cache server, the second edge cache server based on the affinity timestamp indicating a last time and date that other data associated with the user was previously accessed on the second edge cache server and based on a size of the data associated with the user to be transferred; and initiating, by the client device, the transfer of data associated with the user between the client device and the second edge cache server.

2. The method of claim 1, wherein selecting a second edge cache server further comprises randomly selecting the second edge cache server from among a plurality of edge cache servers on a LAN to establish server affinity with the user.

3. The method of claim 1, wherein selecting a second edge cache server further comprises selecting the second edge cache server based on the affinity timestamp and other affinity data.

4. The method of claim 1, further comprising, after receiving a request for transfer of data associated with the user of the client device:

determining if the first edge cache server has previously established server affinity with the user by:

comparing the affinity timestamp with other affinity timestamps received from others of a plurality of edge cache servers; and storing a result of the comparing on the client device.

5. The method of claim 1, wherein initiating the transfer of data associated with the user between the client device and the second edge cache server comprises:

sending, by the client device, the data associated with the user to the second edge cache server having the established server affinity with the user.

6. A client device comprising:

a network interface configured to couple to a local area network (LAN);

one or more processors;

memory coupled to the one or more processors and configured to store instructions, which, when executed by the one or more processors, causes the one or more processors to perform operations comprising:

receiving, by a client device, an affinity timestamp from a first edge cache server indicating a time and a date that data associated with a user was last accessed;

comparing the affinity timestamp received from the first edge cache server with an affinity timestamp received from a second edge cache server;

determining, based on the comparing, that the client device established affinity with the first edge cache server;

transmitting a request for a first edge cache server for transfer of data associated with the user;

determining that the first edge cache server is unavailable, the first edge cache server having previously established server affinity with the user;

selecting, in response to determining that the first edge cache server is unavailable, the second edge cache server based on the affinity timestamp indicating a last time and a last date that other data associated with the user was previously accessed on the second edge cache server and based on a size of the data associated with the user to be transferred; and initiating the transfer of data associated with the user between the client device and the second edge cache server.

7. The device of claim 6, wherein selecting a second edge cache server further comprises:

randomly selecting the second edge cache server from among a plurality of edge cache servers on the LAN to establish server affinity with the user.

8. The device of claim 6, wherein selecting a second edge cache server further comprises:

selecting the second edge cache server based on the affinity timestamp and a size of the data cached by the second edge cache server.

9. The device of claim 6, further comprising, after receiving a request for transfer of data associated with the user of the client device:

determining if the first edge cache server has previously established server affinity with the user by:

comparing the affinity timestamp with other affinity timestamps received from others of a plurality of edge cache servers; and storing a result of the comparing on the client device.

10. The device of claim 6, wherein initiating the transfer of data associated with the user between the client device and the second edge cache server having the established server affinity with the user further comprises:

sending the data associated with the user to the second edge cache server having the established server affinity with the user.

11. The method of claim 1, wherein transmitting the request for the first edge cache server comprises transmitting the request with a hash associated with a user.

12. The client device of claim 6, wherein transmitting the request for the first edge cache server comprises transmitting the request with a hash associated with a user.

* * * * *